(12) United States Patent
Chilimbi et al.

(10) Patent No.: US 7,607,119 B2
(45) Date of Patent: Oct. 20, 2009

(54) VARIATIONAL PATH PROFILING

(75) Inventors: Trishul Chilimbi, Seattle, WA (US);
Erez Perelman, La Jolla, CA (US)

(73) Assignee: Microsoft Corporation, Redmond, WA (US)

( * ) Notice: Subject to any disclaimer, the term of this patent is extended or adjusted under 35 U.S.C. 154(b) by 752 days.

(21) Appl. No.: 11/115,924

(22) Filed: Apr. 26, 2005

(65) Prior Publication Data

US 2006/0242636 A1    Oct. 26, 2006

(51) Int. Cl.
*G06F 9/44* (2006.01)
(52) U.S. Cl. ................................... 717/101
(58) Field of Classification Search .................. None
See application file for complete search history.

(56) References Cited

U.S. PATENT DOCUMENTS

| | | | |
|---|---|---|---|
| 5,220,667 A | 6/1993 | Ichieda | |
| 5,333,311 A | 7/1994 | Whipple, II | |
| 5,713,008 A | 1/1998 | Falkner | |
| 5,740,443 A | 4/1998 | Carini | |
| 5,774,685 A | 6/1998 | Dubey | |
| 5,815,720 A | 9/1998 | Buzbee | |
| 5,909,578 A | 6/1999 | Buzbee | |
| 5,925,100 A | 7/1999 | Drewry et al. | |
| 5,940,618 A | 8/1999 | Urquhart et al. | |
| 5,950,003 A | 9/1999 | Kaneshiro et al. | |
| 5,950,007 A | 9/1999 | Nishiyama et al. | |
| 5,953,524 A | 9/1999 | Meng et al. | |
| 5,960,198 A | 9/1999 | Roediger et al. | |
| 6,026,234 A | 2/2000 | Hanson et al. | |
| 6,073,232 A | 6/2000 | Kroeker et al. | |
| 6,079,032 A | 6/2000 | Peri | |
| 6,148,437 A | 11/2000 | Shah et al. | |
| 6,216,219 B1 | 4/2001 | Cai et al. | |
| 6,233,678 B1 * | 5/2001 | Bala | 712/240 |
| 6,311,260 B1 | 10/2001 | Stone et al. | |
| 6,321,240 B1 | 11/2001 | Chilimbi et al. | |
| 6,330,556 B1 | 12/2001 | Chilimbi et al. | |
| 6,360,361 B1 | 3/2002 | Larus et al. | |
| 6,370,684 B1 | 4/2002 | De Pauw et al. | |
| 6,404,455 B1 | 6/2002 | Ito et al. | |
| 6,560,693 B1 | 5/2003 | Puzak et al. | |

(Continued)

OTHER PUBLICATIONS

Ammons et al., "Improving Data-Flow Analysis with Path Profiles," *SIGPLAN '98*, pp. 72-84 (1998).

(Continued)

*Primary Examiner*—Wei Y Zhen
*Assistant Examiner*—Philip Wang
(74) *Attorney, Agent, or Firm*—Klarquist Sparkman, LLP

(57) ABSTRACT

A run time software test tool instruments a program to perform a low overhead profiling of the program's execution, which records the execution time of frequent acyclic control flow paths using hardware performance counters. An analysis of the profiling data is performed to identify those program paths that have significant variation in execution time across different dynamic traversals in the same program run. This variation (measured as the difference between the fastest execution of that path and slower executions) represents the potential speedup that potentially could be achieved if the paths were optimized (such as by the addition of simple pre-fetch optimizations) to do away with these variations. The variational paths are identified to the programmer to guide optimization.

14 Claims, 8 Drawing Sheets

U.S. PATENT DOCUMENTS

| | | | |
|---|---|---|---|
| 6,571,318 | B1 | 5/2003 | Sander et al. |
| 6,598,141 | B1 | 7/2003 | Dussud et al. |
| 6,628,835 | B1 | 9/2003 | Brill et al. |
| 6,651,243 | B1 | 11/2003 | Berry et al. |
| 6,658,652 | B1 | 12/2003 | Alexander et al. |
| 6,675,374 | B2 | 1/2004 | Pieper et al. |
| 6,704,860 | B1 | 3/2004 | Moore |
| 6,848,029 | B2 | 1/2005 | Coldewey |
| 6,886,167 | B1 | 4/2005 | Breslau et al. |
| 6,951,015 | B2 | 9/2005 | Thompson |
| 7,032,217 | B2 | 4/2006 | Wu |
| 7,181,730 | B2 | 2/2007 | Pitsianis et al. |
| 2002/0133639 | A1 | 9/2002 | Breslau et al. |
| 2002/0144245 | A1 | 10/2002 | Lueh |
| 2003/0145314 | A1* | 7/2003 | Nguyen et al. ............... 717/158 |
| 2004/0015897 | A1 | 1/2004 | Thompson et al. |
| 2004/0015930 | A1 | 1/2004 | Wu |
| 2004/0025145 | A1 | 2/2004 | Dawson |
| 2004/0088699 | A1* | 5/2004 | Suresh ........................ 717/174 |
| 2004/0103401 | A1* | 5/2004 | Chilimbi et al. ............ 717/130 |
| 2004/0103408 | A1 | 5/2004 | Chilimbi et al. |
| 2004/0111444 | A1 | 6/2004 | Garthwaite |
| 2004/0133556 | A1 | 7/2004 | Wolczko et al. |
| 2004/0215880 | A1 | 10/2004 | Chilimbi et al. |
| 2004/0216091 | A1 | 10/2004 | Groeschel |
| 2005/0091645 | A1 | 4/2005 | Chilimbi et al. |
| 2005/0246696 | A1 | 11/2005 | Alexander et al. |
| 2006/0155791 | A1 | 7/2006 | Tene et al. |

OTHER PUBLICATIONS

Ammons et al., "Exploiting Hardware Performance Counters with Flow and Context Sensitive Profiling," *ACM SIGPLAN*, vol. 32, No. 5, pp. 85-96 (1997).
Anderson et al., Continuous Profiling: Where Have All the Cycles Gone? *ACM Transactions on Computer Systems*, vol. 15, No. 4, pp. 357-390 (1997).
Arnold et al., "A Framework for Reducing the Cost of Instrumented Code," *PLDI*, pp. 1-12 (2001).
Ball et al., "Efficient Path Profiling," *IEEE*, pp. 46-57 (1996).
Dean et al., "*ProfileMe:* Hardware Support for Instruction-Level Profiling on Out-of-Order Processors," *IEEE* (1997).
Eeckhout et al., "Workload Design: Selecting Representative Program-Input Pairs," *Proceedings of the 2002 International Conference on Parallel Architectures and Compilation Techniques* (2002).
Hirzel et al., "Bursty Tracing: A Framework for Low-Overhead Temporal Profiling," *Microsoft Research* (2001).
"Technologies for Measuring Software Performance," *Intel Corporation* (2003).
Larus, "Whole Program Paths," *SIGPLAN '99 Conference on Programming Languages and Design* (1999).
Melski et al., "Interprocedural Path Profiling", *University of Wisconsin*, pp. 1-50 (1998).
Mowry et al., "Predicting Data Cache Misses in Non-Numeric Applications Through Correlation Profiling," *International Symposium on Microarchitecture* (1997).
Srivastava et al., "Vulcan Binary Transformation in a Distributed Environment," *MSR-TR-2001-50, Microsoft Research* (2001).
"JProfiler Manual," *ejtechnologies*, GmbH, pp. 1-141 (2004).
Zorn et al., "A Memory Allocation Profiler for C and Lisp Programs," published Feb. 16, 1988, pp. 1-18.
English et al., "Loge: a self-organizing disk controller," *Proc. USENIX Winter 1992 Tech. Conf.*, San Francisco, pp. 237-251 (Jan. 1992).
Hatfield et al., "Program Restructuring for Virtual Memory," *IBM Sys. J.*, No. 3, pp. 168-192 (1971).
Kroeger et al., "Predicting Future File-system Actions from Prior Events," *Proc. USENIX Annual Tech. Conf.*, San Diego, pp. 1-10 (Jan. 1996).
Palmer et al., "Fido: A Cache that Learns to Fetch," *Proc. 17th Int'l Conf. on Very Large Databases*, Barcelona, pp. 255-264 (Sep. 1991).
Patterson et al., "Informed Prefetching and Caching," *Proc. 15th ACM Symp. on Operating System Principles*, Copper Mountain Resort, CO, pp. 79-95 (Dec. 1995).
Staelin et al., "Smart Filesystems," *Proc. USENIX—Winter '91*, Dallas, TX, pp. 45-51 (1991).
Tait et al., "Detection and Exploitation of File Working Sets," *IEEE*, pp. 2-9 (1991).
U.S. Appl. No. 11/134,812, filed May 20, 2005, Ganapathy et al.
U.S. Appl. No. 11/134,796, filed May 20, 2005, Shankar et al.
Annavaram et al., "Data Prefetching by Dependence Graph Precomputation", IEEE (2001), pp. 52-61.
Bala et al., "Dynamo: A Transparent Dynamic Optimization System", ACM (2000), pp. 1-12.
Balakrishnan et al., "Analyzing Memory Accesses in $_x86$ Binary Executables", *Proc. 13th Intl. Conference on Compiler Construction*, LNCS 2985 (Apr. 2004), pp. 5-23.
Berger et al., "Composing High-Performance Memory Allocators", ACM (2001), 11 pages.
Bush et al., "A Static Analyzer for Finding Dynamic Programming Errors", *Software: Practice and Experience* (2000), pp. 775-802.
Cahoon et al., "Data Flow Analysis for Software Prefetching Linked Data Structures in Java", IEEE (2001), 12 pages.
Calder et al., "Cache-Conscious Data Placement", ACM (1998), 11 pages.
Chen et al., "Reducing Memory Latency via Non-Blocking and Prefetching Caches", ACM (1992), pp. 51-61.
Chilimbi et al., "Cache-Conscious Structure Definition", *Proceedings of the ACM SIGPLAN '99* (May 1999), 12 pages.
Chilimbi et al., "Cache-Conscious Structure Layout", *Proc. ACM SIGPLAN '99 Conf. on Programming Language Design and Impl.*, (May 1999), 12 pages.
Chilimbi et al., "Dynamic Hot Data Stream Prefetching for General-Purpose Programs", ACM (2002), 11 pages.
Chilimbi, "Efficient Representations and Abstractions for Quantifying and Exploiting Data Reference Locality", ACM (2001), pp. 191-202.
Chilimbi et al., "Low-Overhead Memory Leak Detection Using Adaptive Statistical Profiling", *Proc. 11th Intl. Conference on Architectural Support for Programming Language and Operating Systems (ASPLOS)*, (Oct. 2004), pp. 156-164.
Chilimbi et al., "On the Stability of Temporal Data Reference Profiles", PACT (Sep. 2001), 10 pages.
Chilimbi et al., "Using Generational Garbage Collection to Implement Cache-Conscious Data Placement", *Proceedings of the First International Symposium on Memory Management* (Oct. 1998), vol. 34(3), pp. 37-48.
Cooksey et al., "A Stateless, Content-Directed Data Prefetching Mechanism", ACM (2002), pp. 279-290.
Cowan et al., "Buffer Overflows: Attacks and Defenses for the Vulnerability of the Decade", *DARPA information survivability conference and expo (DISCEX)* (2000), pp. 1-11.
Crescenzi at al., "A Compendium of NP Optimization Problems," [Downloaded from the World Wide Web on Dec. 12, 2003], 20 pages.
Deaver et al., "Wiggins/Redstone: An On-line Program Specializer", *Proceedings of the IEEE Hot Chips XI Conference* (Aug. 1999), 29 pages.
Demsky et al., "Automatic Detection and Repair of Errors in Data Structures", *Proceedings of 18th ACM SIGPLAN Conference on Object-Oriented Programming Systems, Language and Applications (OOPLSA)* (Oct. 2003), pp. 78-95.
Demsky et al., "Role-Based Exploration of Object-Oriented Programs", *Proceedings of 24th International Conference on Software Engineering (ISCE)* (May 2002), pp. 313-334.
Dor et al., "Cleanness Checking of String Manipulations in C Programs via Integer Analysis", *Proc. 8th Int'l Static Analysis Symposium* (Jun. 2001), 19 pages.
Dor et al., "CSSV: Towards a Realistic Tool for Statically Detecting All Buffer Overflows in C", *PLDI'03* (Jun. 9-11, 2003), pp. 155-167.
Duesterwald et al., "Software profiling for hot path prediction: Less is more," *Ninth International Conference on Architectural Support for Programming Languages and Operating Systems* (Nov. 2000), pp. 202-211.

Edwards, "Black-Box Testing Using Flowgraphs: An Experimental Assessment of Effectiveness and Automation Potential", *Software Testing, Verification and Reliability*, vol. 10, No. 4 (Dec. 2000), pp. 249-262.

Ernst, "Dynamically Discovering Likely Program Invariants", *PhD Thesis, University of Washington* (Aug. 2000), pp. 1-127.

Evans et al., "Improving Security Using Extensible Lightweight Static Analysis", *IEEE Software* (Jan./Feb. 2002), pp. 42-51.

Evans et al., "LCLint: A Tool for Using Specifications to Check Code", *SIGSOFT Symposium on the Foundations of Software Engineering* (Dec. 1994), 10 pages.

Evans et al., "Splint Manual, Version 3.1.1-1", *Secure Programming Group, University of Virginia Department of Computer Science* (Jun. 5, 2003), 121 pages.

Evans, "Static Detection of Dynamic Memory Errors", *SIGPLAN Conf. on Programming Language and Design Implementation* (May 1996), 10 pages.

Evans, "Using Specifications to Check Source Code", *TR-628, MIT Lab for Computer Science* (Jun. 1994), 97 pages.

Foster et al., "A Theory of Type Qualifiers", *Proc. ACM SIGPLAN '99 Conf. on Programming Language and Design Implementation (PLDI)* (May 1999), 12 pages.

Gloy et al., "Procedure Placement Using Temporal-Ordering Information", *ACM Transactions on Programming Languages and System*, vol. 21 (1999), pp. 111-161.

Guyer et al., "An Annotation Language for Optimizing Software Libraries", *Proc. Second Conf. on Domain Specific Languages* (Oct. 1999), 14 pages.

Halldorsson, "Approximations of Weighted Independent Set and Hereditary Subset Problems", *JGAA*, vol. 4, No. 1 (Apr. 2000), pp. 1-16.

Hangal et al., "Tracking Down Software Bugs Using Automatic Anomaly Detection", *Proceedings of 22nd International Conference on Software Engineering (ICSE)* (Jan. 1992), pp. 125-136.

Harris, "Dynamic Adaptive Pre-tenuring", *Proceedings of the International Symposium on Memory Management* (Oct. 2000), 9 pages.

Hastings et al., "Purify: Fast Detection of Memory Leaks and Access Errors", *Proceedings of the Winter 1992 USENIX Conference* (1992), 10 pages.

Heil et al., "Relational Profiling: Enabling Thread-Level Parallelism in Virtual Machines", *Proc. 33rd International Symposium on Microarchitecture* (Dec. 2000), pp. 1-10.

Hirzel et al., "Understanding the Connectivity of Heap Objects", *Proceedings of International Symposium on Memory Management (ISMM)* (Jun. 2002), pp. 143-156.

Hollingsworth et al., "MDL: A Language and Compiler for Dynamic Program Instrumentation", *Proc. Of the International Conference on Parallel Architectures and Compilations Techniques* (Nov. 1997), 12 pages.

Hölzle et al., "Reconciling Responsiveness with Performance in Purse Object-Oriented Languages", *ACM Transactions on Programming Languages and Systems* (Jul. 1996), pp. 1-40.

Horning, "The Larch Shared Language: Some Open Problems", *Compass/ADT Workshop* (Sep. 1995), 16 pages.

Joseph et al., "Prefetching Using Markov Predictors", ACM (1997), pp. 252-263.

Jouppi, "Improving Direct-Mapped Cache Performance by the Addition of a Small Fully-Associative Cache and Prefetch Buffers", IEEE (1990), pp. 364-373.

Karlsson et al., "A Prefetching Technique for Irregular Accesses to Linked Data Structures", *Sixth International Symposium on High-Performance Computer Architecture* (Jan. 2000), 12 pages.

Khurshid et al., "An Analyzable Annotation Language," *OOPSLA '02* (Nov. 2002), 15 pages.

Kistler et al., "Automated Data-Member Layout of Heap Objects to Improve Memory-Hierarchy Performance," *ACM Transactions on Programming Language and Systems*, (2000), 16 pages.

Klaiber et al., "An Architecture for Software-Controlled Data Prefetching", ACM (1991), pp. 43-53.

Kramer, "Examples of Design by Contract in Java Using Contract, the Design by Contract™ Tool for Java™", *Object World Berlin '99, Design & Components* (May 17-20, 1999), 26 pages.

Larochelle et al., "Statistically Detecting Likely Buffer Overflow Vulnerabilities", *2001 USENIX Security Symposium* (Aug. 2001), 5 pages.

Leavens et al., "Enhancing the Pre-and Postcondition Technique for More Expressive Specifications", *Proc. World Congress on Formal Methods in the Development of Computing Systems* (Sep. 1999), 21 pages.

Leavens et al., "Preliminary Design of JML", *Technical Report 98-06v, Iowa State University Department of Computer Science* (Jun. 1998-2003; revised May 2003), 94 pages.

Leino, "Checking Correctness Properties of Object-Oriented Programs," *Internet*, http://research.microsoft.com/leino/paper/1 (Aug. 19, 2002), 49 pages.

Luk et al., "Compiler-Based Prefetching for Recursive Data Structures", ACM (1996), pp. 222-233.

Microsoft Corporation, "Scalable Program Analysis", *Internet*, http://research.microsoft.com/spa/ (downloaded on Sep. 5, 2003), 3 pages.

Mowry et al., "Design and Evaluation of a Compiler Algorithm for Prefetching", ACM (1992), pp. 62-73.

Nevill-Manning et al., "Identifying Hierarchical Structure in Sequences: A Linear-time Algorithm", *Journal of Artificial Intelligence Research* (1997), 7:67-82.

Petrank et al., "The Hardness of Cache Conscious Data Placement," *29th Annual ACM Symposium on Principles of Programming Languages* (2002), 33 pages.

Roth et al., "Dependence Based Prefetching for Linked Data Structures", *Proceedings of the 8th International Conference on Architectural Support* (Oct. 1998), pp. 115-126.

Roth et al., "Effective Jump-Pointer Prefetching for Linked Data Structures", IEEE (1999), pp. 111-121.

Rubin et al., "An Efficient Profile-Analysis Framework for Data-Layout Optimizations", *POPL* (Jan. 2002), pp. 140-153.

Saavedra et al., "Improving the Effectiveness of Software Prefetching With Adaptive Execution", *IEEE* (1996), pp. 68-78.

Sastry et al., "Rapid Profiling Via Stratified Sampling", *International Symposium on Computer Architecture* (2001), pp. 1-12.

Savage et al., "Eraser: a dynamic data race detector for multighreaded programs", *ACM Transactions on Computer Systems (TOCS)* (1997), 391-411.

Seidl et al., "Segregating Heap Objects by Reference Behavior and Lifetime", *8th Int'l Conf. on Architectural Support for Programming Languages and Operating Systems* (Oct. 1998), 12 pages.

Shaham, "Automatic Removal of Array Memory Leaks in Java", (1999), 12 pages.

Srivastava, "ATOM: A System for Building Customized Program Analysis Tools", *SIGPLAN '94 Conf. on Programming Language Design and Impl.* (1994), 25 pages.

Stoutchinin et al., "Speculative Prefetching of Induction Pointers", *Proceedings of 10th International Conference on Compiler Construction* (2001), 15 pages.

Traub et al., "Ephemeral instrumentation for lightweight program profiling", *Technical report,* Harvard University (2000), pp. 1-13.

Truong et al., "Improving Cache Behavior of Dynamically Allocated Data Structures", *PACT* (1998), 8 pages.

Vanderwiel et al., "Data Prefetch Mechanisms", *ACM Computing Surveys*, vol. 32, No. 2 (Jun. 2000), pp. 174-199.

Wahls et al., "The Direct Execution of SPECS-C++: A Model-Based Specification Language for C++ Classes", *Technical Report TR94-02b, Iowa State University Department of Computer Science* (Nov. 18, 1994), 52 pages.

Zhou et al., "AccMon: Automatically Detecting Memory-Related Bugs via Program Counter-Based Invariants," *Proceedings of 37th International Symposium on Micro-Architecture (MICRO)* (Dec. 2004).

Zilles et al., "A Programmable Co-processor for Profiling", *Proceedings of the 7th International Symposium on High Performance Architecture* (Jan 2001), 12 pages.

Diwan et al., "Memory-System Performance of Programs with Intensive Heap Allocation," ACM TOCS vol. 13, Issue 3, Aug. 1995, ISSN: 0734-2071, 30 pages.

Griffioen et al., "Reducing File System Latency Using a Predictive Approach," Proceedings of the USENIX Summer 1994 Technical Conference on USENIX, 11 pp.

Cifuentes, "Structuring Decompiled Graphs," Technical Report 5/94, Faculty of Information Technology, Queensland University of Technology, GPO Box 2434, Brisbane 4001, Australia (Apr. 1994), 15 pages.

Hauck, "Configuration Prefetch for Single Context Reconfigurable Coprocessors," In Proceedings of the ACM/SIGDA International Symposium on Field Programmable Gate Arrays (Feb. 1998), pp. 65-74.

Ung et al., "Optimising Hot Paths in a Dynamic Binary Translator," In Workshop on Binary Translation, Oct. 2000, pp. 55-65.

Gonzalez et al., "Eliminating Cache Conflict Misses Through XOR-Based Placement Functions," ICS 97, 997, pp. 76-83.

\* cited by examiner

Figure 8

```
1  while (ito < heap_tail) {
2      if (heap[ito+1]->cost < heap[ito]->cost)
3          ito++;
4      if (heap[ito]->cost > heap[ifrom]->cost)
5          break;
6**    if (ito*8 < heap_tail)
7**        _mm_prefetch((char*)&heap[ito*8]->cost, 1);
8      temp_ptr = heap[ito];
9      heap[ito] = heap[ifrom];
10     heap[ifrom] = temp_ptr;
11     ifrom = ito;
12     ito = 2*ifrom;
13 }
```

Figure 9

```
1  for (tj=0;tj<numf2s;tj++) {
2      Y[tj].y = 0;
3      if ( !Y[tj].reset ) {
4**        if(tj < (numf2s -1))
5**            for (ti=0;ti<numf1s;ti++) {
6**                _mm_prefetch((char*)&(bus[ti][tj+1]), 1);
7**                Y[tj].y += f1_layer[ti].P * bus[ti][tj];
8**            } else
9              for (ti=0;ti<numf1s;ti++)
10                 Y[tj].y += f1_layer[ti].P * bus[ti][tj];
11 } }
```

Figure 10

```
1   while( arcin )
2   {
3      tail = arcin->tail;
4**    if ((arc_t*)tail->mark) {
5**        _mm_prefetch((char*)
6**           &(((arc_t*)tail->mark)->tail->time),1);
7**        _mm_prefetch((char*)
8**           &(((arc_t*)tail->mark)->org_cost),1);
9**    }
10     if( tail->time + arcin->org_cost > latest ) {
11         arcin = (arc_t *)tail->mark;
12         continue;
13     }
14     red_cost = compute_red_cost( arc_cost, tail,
15                                  head_potential );
16     if( red_cost < 0 ) {
17         if( new_arcs < MAX_NEW_ARCS ) {
18             insert_new_arc( arcnew, new_arcs, tail,
19                             head, arc_cost, red_cost );
20             new_arcs++;
21         }
22         else if((cost_t)arcnew[0].flow > red_cost)
23             replace_weaker_arc( arcnew, tail, head,
24                                 arc_cost, red_cost );
25     }
26     arcin = (arc_t *)tail->mark;
27  } }
```

Variational Path Profiling Tool Software
1180

VARIATIONAL PATH PROFILING

TECHNICAL FIELD

The field relates to profiling of program execution, such as for the purpose of guiding program optimization.

BACKGROUND

Current profiling techniques are good at informing programmers where time is being spent during program execution. Many programmers use hierarchical and path profiling tools to identify the basic blocks and procedures that account for most of the program's execution time. (See, e.g., J. Gosling, B. Joy, and G. Steele, "Hiprof Advanced Code Performance Analysis Through Hierarchical Profiling"; Thomas Ball and James R. Larus, "Efficient Path Profiling," *International Symposium on Microarchitecture*, pages 46-57, 1996; James R. Larus, "Whole Program Paths," *Proceedings Of The ACM SIGPLAN* 1999 *Conference On Programming Language Design And Implementation*, pages 259-269. ACM Press, 1999; Glenn Ammons and James R. Larus, "Improving Data-Flow Analysis With Path Profiles," *SIGPLAN Conference on Programming Language Design and Implementation*, pages 72-84, 1998; David Melski and Thomas W. Reps, "Interprocedural Path Profiling," *Computational Complexity*, pages 47-62, 1999; and JProfiler profiling tool available from ej-technologies Gmbh.)

In addition, hardware performance counter based profiling tools (like VTune performance analyzer available from Intel Corporation) are used to determine program regions that incur a large number of cache misses and branch mispredictions. These tools allow programmers to attempt to speedup program execution by focusing on the frequently executed loops as well as those that account for the most misses. Unfortunately, these profiling techniques lack the ability to direct a programmer to the program section that has the largest speedup opportunity for optimization. For example, a profiling tool may report that the largest fraction of execution time is spent in an inner loop of a matrix multiply routine. This information is unlikely to be very useful for speeding up the program as it is likely that this routine has already been heavily optimized.

SUMMARY

Program analysis techniques described herein (which we call Variational Path Profiling (VPP)) address this shortcoming by focusing on identifying acyclic program paths that have the highest variance in their execution. Variation in execution time of the same path usually arises from differences in the micro architectural state of the machine during different dynamic path invocations. These paths with the highest execution time variance are very likely those places in the program where significant optimization opportunities for speedup exist. To find the paths with high variance, a VPP technique described herein records the execution time it takes to execute frequent acyclic control flow paths using hardware counters. The hardware cycle counter is sampled at the start of the path's execution and again at the end of its execution. This can be accomplished with minimal overhead using a Bursty Tracing technique, such as that described by M. Hirzel and T. Chilimbi, "Bursty Tracing: A Framework For Low-Overhead Temporal Profiling," 2001.

One VPP technique described herein takes these timing measurements and finds the control flow paths that have significant variation in execution time across the different time samples. This VPP technique examines one path at a time and only looks at the variance in timings for that specific path. A path with high timing variance implies that there are certain executions of that path that took significantly less time to execute than others. Such variance in execution time represents a significant opportunity for speedup, in that every dynamic invocation of that path should be able to take the minimal sampled execution time assuming the stalls on the time consuming invocations can be removed with optimization. The described VPP technique pinpoints exactly these paths with high variance so a programmer can focus on optimizing paths with a large speedup potential.

The VPP technique can be used as a complement to conventional program profilers. By itself, the described VPP technique does not report program paths that are uniformly slow across all executions. Conventional program profilers can be used in addition to the VPP technique for cases in which a programmer is interested in this information.

Additional features and advantages of the invention will be made apparent from the following detailed description of embodiments that proceeds with reference to the accompanying drawings.

BRIEF DESCRIPTION OF THE DRAWINGS

FIG. 8 is a program source code listing for one example optimization that may be applied to a high variation path identified by the tool of FIG. 1.

FIG. 9 is a program source code listing for a second example optimization that may be applied to a high variation path identified by the tool of FIG. 1.

FIG. 10 is a program source code listing for a third example optimization that may be applied to a high variation path identified by the tool of FIG. 1.

DETAILED DESCRIPTION

The following description is directed to techniques for profiling and analysis to identify variational paths in a program to guide a programmer's optimization effort. More particularly, this low overhead variational path profiling approach pinpoints those paths in a program's execution that have larger variations in their execution time. Experimental results discussed below show that this variation accounts for a large fraction of overall program execution time. In addition, these experimental results show that a small number of paths (top 10) account for most of the variation and these paths are quite stable under different program inputs and system load conditions. Various examples also are presented below that use this variational path information to perform very simple optimizations for a handful of the SPEC benchmarks resulting in execution time improvements of 8:1.

1. Overview of Variational Path Optimization

Figure 1:
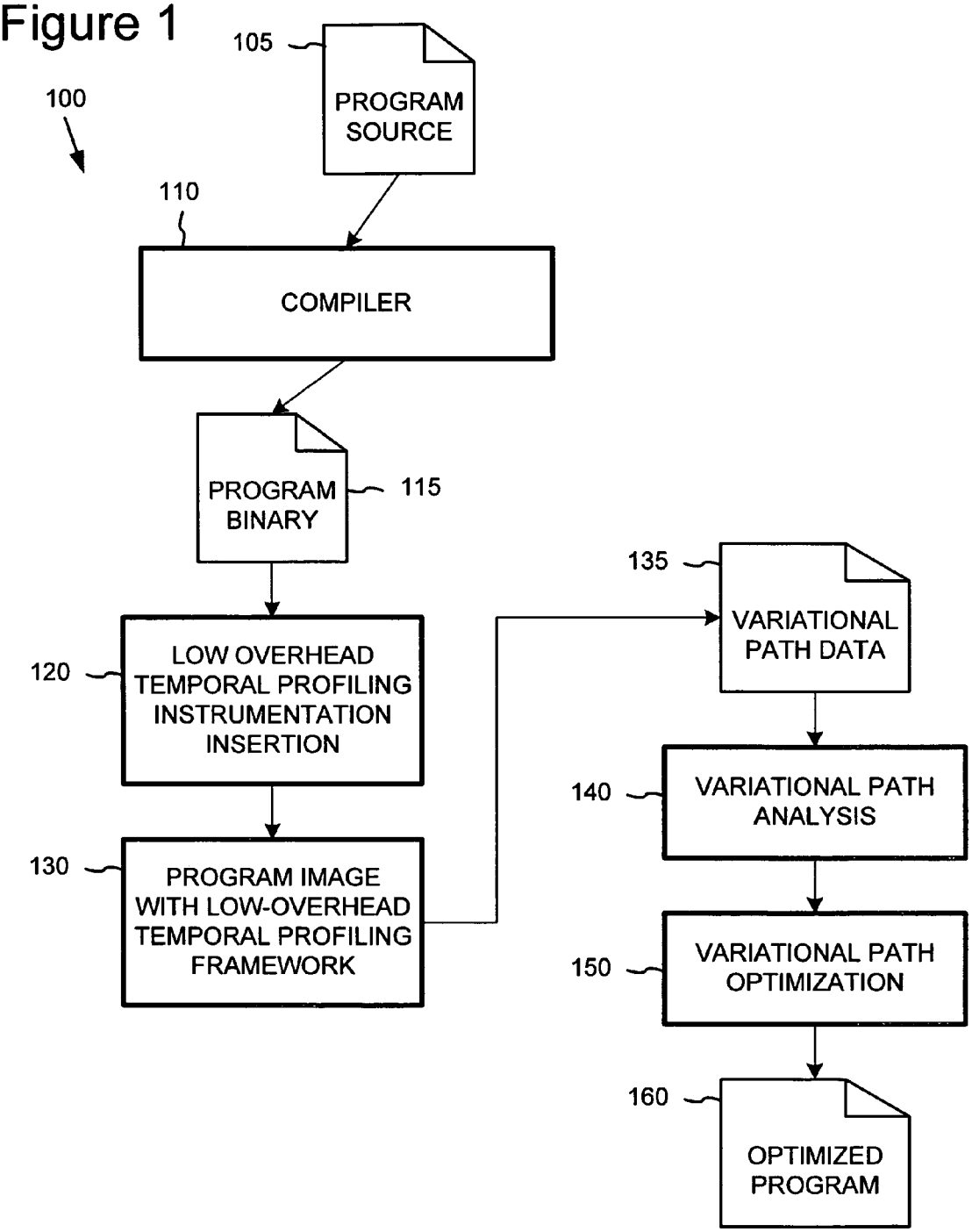
FIG. 1 is a data flow diagram of a software analysis tool utilizing variational path profiling to optimize a computer program.

With reference to FIG. 1, an exemplary software analysis tool 100 provides an implementation of variational path profiling, analysis and optimization techniques described more fully herein that aid in optimizing a computer program. The exemplary tool 100 includes a profiling instrumentation tool 120 to insert instrumentation into a program image 130 for sampling path timings of the program's execution. In the exemplary software analysis tool 100, the instrumentation tool inserts a low-overhead temporal profiling framework described more fully below that includes instrumentation and checking code for profiling path timings in long burst samples of a trace of the program's execution. In the exemplary tool 100, the profiling instrumentation tool 122 inserts the instrumentation and checking code for the low-overhead temporal profiling framework by modifying an executable or binary version 115 of the program to be optimized, after compiling and linking by a conventional compiler 110 from the program's source code version 105. For example, the source code 105 of the program to be optimized may be initially written by a programmer in a high level programming language, such as C or C++. Such program source code is then compiled using an appropriate conventional compiler 110, such as a C/C++ compiler available in the Microsoft® Visual Studio development platform, to produce the machine-executable program binary 115. The profiling instrumentation tool 120 can be the Vulcan executable editing tool for x86 computer platform program binaries, which is described in detail by A. Srivastava, A. Edwards, and H. Vo, "Vulcan: Binary Transformation In A Distributed Environment," Technical Report MSR-TR-2001-50, Microsoft Research (2001). This tool has the advantage that it does not require access to the source code, and can employed to optimize programs where only an executable binary version is available. In other embodiments, the profiling framework can be built into the program image 130 as part of the process of compiling the program from source code or an intermediate language form, such as for use with programs written in Java, or intermediate code representations for the Microsoft .Net platform. In such other embodiments, the compiler that inserts instrumentation and checks embodies the profiling instrumentation tool 120.

The temporal profiling framework provided in the program image 130 produces variational path data 135 representing path timings in sampled bursts of the program's execution trace. The exemplary tool 100 also includes a variational path analysis tool 140 and optimization tool 150. The variational path analysis tool 140 processes the profiled variational path data 135 to identify execution paths in the program code whose execution times have the most variation. Based on this identification, the programmer can apply optimizations to these variational paths with the optimization tool 150, which may be a program source editing tool or other code optimization tool, aimed at avoiding page faults or other causes of the lengthier execution times through the paths. Some examples of such optimizations are discussed below.

2. Path Variational Profiling

As briefly outlined above, the exemplary tool 100 profiles execution of the computer program to be optimized under expected usage conditions (e.g., expected or typical program inputs) to collect execution timings for various paths or code segments in the program. Instrumentation to capture these path execution timings is inserted into the computer program by the instrumentation tool 120. In an exemplary implementation, this instrumentation is included in a low-overhead tracing framework (called the bursty tracing framework) that controls a rate of sampling traces of the program's execution as discussed further below. The use of this low overhead tracing framework is intended to reduce or minimize the effect that the addition of profiling instrumentation code may have on execution timings as compared to the non-instrumented, original computer program. However, in alternative implementations of the tool 100, the path profiling instrumentation code need not be structured based on this bursty tracing framework.

2.1 Low Overhead, Bursty Tracing Framework

Variability in program execution can be observed across many metrics- memory miss rates, branch missprediction, power and performance. The variational path profiling approach described here observes variations in execution time for code segments. To measure these variations, the exemplary tool 100 employs the sampling technique (called Bursty Tracing) described by M. Hirzel and T. Chilimbi, "Bursty Tracing: A Framework For Low-Overhead Temporal Profiling," 2001; and further detailed by Trishul A. Chilimbi and Martin Hirzel, "Dynamic Temporal Optimization Framework," U.S. patent application Ser. No. 10/305,056, filed Nov. 25, 2003, and which is hereby incorporated herein fully by reference. Bursty tracing enables periodic sampling of execution intervals with low overhead. The rate of sampling and size of samples can be tuned, and provides a detailed view of execution at a minimal performance cost. Bursty Tracing minimizes profiling overhead by executing a program with very light instrumentation the majority of the time, and occasionally transitioning into a fully instrumented version to do profiling.

Figure 2:
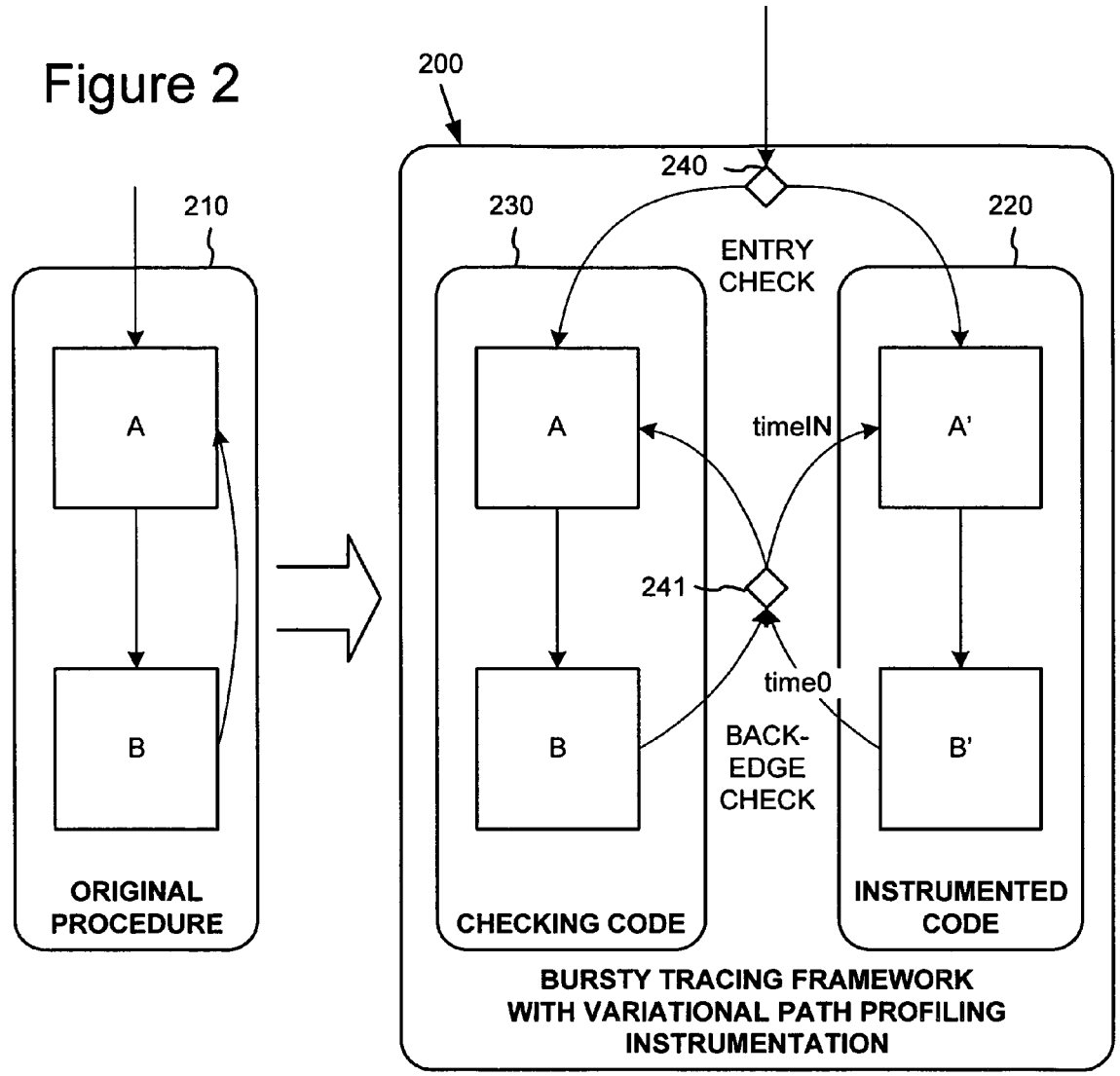
FIG. 2 is a block diagram of a low overhead, bursty tracing profiling framework according to the prior art, which is adapted with the addition of variational path instrumentation to gather variational path timings in the tool of FIG. 1.

FIG. 2 shows an example 200 of inserting variational path profiling instrumentation with the bursty tracing framework in a procedure 210 of the computer program. This insertion can be made directly in the compiled program binary, or alternatively can be inserted into the program source prior to compiling. The original procedure 210 is cloned for the instrumented program image 130 (FIG. 1), and the clone is embedded with instrumentation code to do the desired profiling. In the variational path profiling tool, the added instrumentation code includes code described more fully below that records the execution timings of paths in the sampled execution trace. The instrumentation code is structured according to the bursty tracing framework to reduce the performance overhead of profiling.

According to the bursty tracing framework 200, the cloned procedure in the instrumented program image includes dispatch checks 240, 241 (represented as the diamond in the drawing) inserted at the entry and back edges to manage execution transitions between the two versions (checking and instrumented) of the cloned procedure. The instrumented version of the procedure includes the code described below to record execution time through the code path, whereas there is no instrumentation code to record execution times in the checking version. The dispatch check is managed with two counters: nCheck and nInstr. Initially, nCheck is set to a nCheckThresh (e.g. 10,000 in our case) and nInstr is set to zero. Execution begins in the checking code, and every time it passes through the dispatch check the nCheck is decremented. Once nCheck reaches zero, nInstr is set to nInstrThresh and execution transfers to the instrumented code. Each iteration through the back edge nInstr is decremented. Once nInstr reaches zero, nCheck is initialized to its threshold again (10,000), and execution transfers back to the clean code. This process is repeated until execution completion. Bursty Tracing applies this process to the entire program by duplicating all the procedures and inserting dispatch checks along all back edges and procedure calls in the instrumented program image 130 (FIG. 1).

2.2 Collecting Path Timings

The exemplary tool 100 inserts instrumentation code structured in the Bursty Tracing framework to measure execution time of acyclic paths. The profiling performed by the instrumentation code is very time sensitive, and desirably accurately measures how much time an acyclic path executes. The instrumentation code inserted in the exemplary tool 100 gathers the path timings using the hardware cycle counter to record a time stamp before and after the execution of the path. These points are denoted in FIG. 2 for the exemplary instrumented procedure along the edges leading in and out of the path as timeIn and timeO respectively.

With the instrumentation structured according to the bursty tracing framework, this can be achieved by setting the Bursty Tracing parameter nInstrThres to 1. This causes a sample to be collected for a single iteration of an acyclic path in the instrumented code. However, alternative implementations of variational path profiling can collect timings for multiple path iterations. Collecting the execution timing of only a single iteration in the instrumentation code can be desirable for two reasons:

1. Timing profiles are collected only for acyclic execution paths, as opposed to measuring aggregate timings for consecutive iterations of acyclic paths.
2. Instrumentation overhead can bias the timing profiles. For example, consecutive iterations through the instrumentation code can cause iteration profiles to be influenced by adjacent iteration's overhead.

In the above described implementation of variational path profiling using the bursty tracing framework, the acyclic path boundaries are demarcated by dispatch checks. Thus, the acyclic paths either start at a procedure entry or loop backward branch and also end at one of these points. Alternatively, the instrumentation code for variational path profiling can place the path start and end points at other locations in the program.

The variational path profiling instrumentation code collects profiling or path execution timing samples for paths in the computer program. In the exemplary implementation, each profiling sample records in a data structure the execution time from entry to exit of a single acyclic path of execution, the branch history for the path that was executed, and the program counter (PC) or instruction pointer at the entry point to the path. Alternative implementations of variational path profiling can record profiling data with more or less information. At the end of program execution, all of these samples (i.e., the contents of the profile) are stored to disk to be post processed as described in the next section to find the paths with high variation. The branch history is stored as a series of bits indicating if the branch was taken or not. We are careful to read the cycle counter right before path execution begins and again right after it exits. This will provide the most accurate time for how long execution took for the path instructions. Even with this light weight sampling, the path timings collected in the exemplary tool are slightly biased by the profiling overhead. In experiments, this bias was found to be consistent throughout all the timings, and can be accounted for in the variational path analysis.

Profiling an execution of the instrumented program image to completion produces a file with all the sampled paths' timings, branch histories, and PCs. A timing for a path consists of two time stamps: one before the path executes and one after exiting the path. To compute the path execution time we subtract the entry time from the exit time. This will provide a precise duration in cycles of how long the path executed. We describe in the following section how the exemplary tool uses this data to analyze the path variation.

3. Path Variational Analysis and Optimization

As discussed above with reference to FIG. 1, the tool 100 next analyzes the data collected by the variational path profiling to determine path timing variations, and also rank these variations to identify the top variational paths in the program on which to focus optimization efforts.

3.1 Path Variability and Picking the Top N Variable Paths

The above described variational path profiling collects profiles for execution paths in the program. In the implementation using the bursty tracing framework, profiles are collected for all paths that execute more than the sampling rate (1 sample for every 10,000 iterations of the path). Each path profile sample contains three data fields that we use in analyzing path variability:

1. Path entry point: PC
2. Path branch history a string of bits
3. A cycle count of how long it took to execute the path Alternatively, the variational path profiling can produce and the variational path analysis use more or less profiling information than in this exemplary implementation.

In the variational path analysis implemented in the exemplary tool 100, the analysis combines the path PC and branch history bits to form a path signature, PC-branch history. This signature represents a precise point in the code of where the path begins, and a mapping through all the branches until the path exits. It also informs us of how long the path is in number of basic blocks. For example, the path signature, 0x0040211F-110, means the path starts at PC=0x0040211F, executes through the first two taken branches and a third none taken branch, and is 3 basic blocks long.

The variational path analysis uses the path signature to filter for each unique path's time samples. The variational path analysis keeps only the paths which have two or more time samples, which is the minimum information required for measuring variability. We now describe the analysis to compute the path variation on a unique path's execution times.

The variational path analysis on a path computes a measurement of variability: how much time variation the path exhibits which has potential for optimization. The first step in computing path variability is setting the base time. This is the minimum time we observe for a path. We compute a time delta for each of the other path times by subtracting the base time from it. The time delta signifies how much extra time the path executed for. The path variability is then computed by summing up the time deltas of all samples for the path. We define the path variation time for a single path i as follows:

path variation time(i)=(total path execution time(i)) minus (path frequency(i)×(path base time(i))). This path variation time represents the potential execution time savings if all executions of that path took the base time to execute. This is an ideal estimate of the potential savings, but the ramifications of optimizing a portion of the path variation can be substantial. The variational path analysis then uses this path variation time metric to rank paths. In other words, the variational path analysis then ranks or orders the paths according to this estimate of the potential execution time savings, such as from highest to least potential savings.

3.2 Path Variability For Various Example Programs

Figure 3:
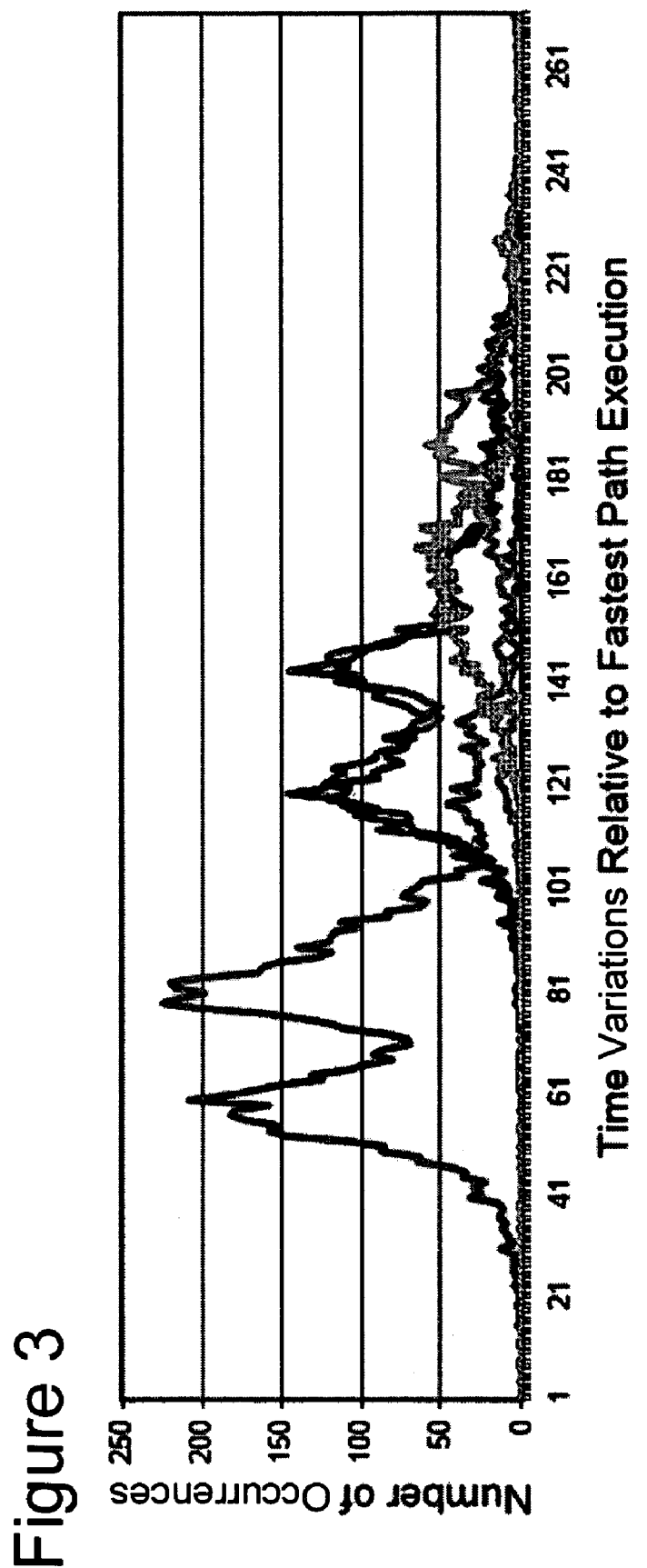
FIG. 3 is a variational path histogram showing variations from base timing for the top 5 ranked paths of an example computer program subjected to the variational path profiling and analysis using the tool of FIG. 1, where the origin on the horizontal (x-) axis denotes the base timing (shortest or minimum time sample) of the respective path. The farther along the x-axis, the larger the time delta is of the respective timing sample for the path from its base time. The vertical (y-) axis measures the number of timing samples of the path having the indicated variation from the base time.

The above-described variational path profiling and analysis was experimentally performed on various example programs. The example programs were chosen from a benchmark performance testing suite, called SPEC2000. The programs chosen from this suite are ammp, art, bzip, equake, gcc, mcf, parser, twolf, vortex and vpr, because they provide a good representation of the suite and exhibit a range of unique, interesting behaviors. These experimental results demonstrate the optimization results that potentially can be achieved with the exemplary tool 100 using the variational path profiling technique FIG. 3 is a histogram of time deltas for the top five paths with highest variability (one line for each path), which was produced by the variational path profiling and analysis for the experiment on the example bzip2 program. In this histogram, the x-axis measures time variations relative to the base time, where the origin denotes the base time. The further along the x-axis the larger the time delta is for a path sample from the base time of the respective path. The y-axis measures the frequency of paths that have the time delta. We can see that for each of the paths illustrated, a substantial portion of execution time is spent with a high variance (distance from origin). A measure of path variability can be calculated from this graph by computing the area under a path's histogram curve. In addition, the spikes or peaks in a curve likely correspond to accesses hitting at different levels of the memory hierarchy. Since paths may include multiple load instructions, some of which may hit while others miss, these spikes are not always sharply defined.

Figure 4:
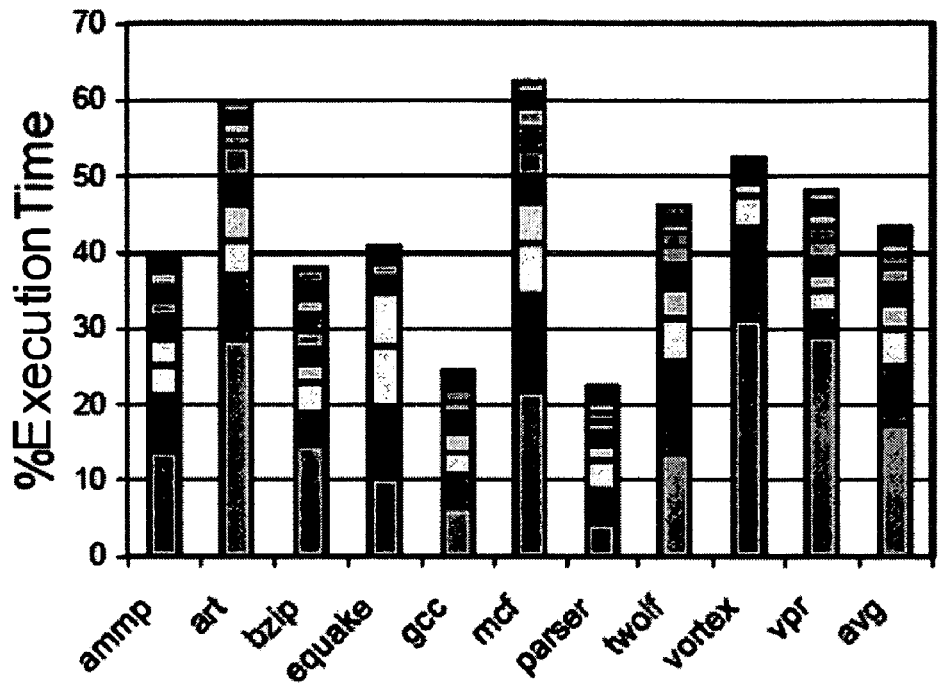
FIG. 4 is a bar chart showing percentage of execution time relative to total program execution of the top ten path variations for various example computer programs subjected to the variational path profiling and analysis of the tool of FIG. 1.

FIG. 4 shows the path variation time for experiments of the variational path profiling on the example benchmark programs executing reference inputs. For each of the benchmark programs, the path variation time (i.e., sum of time deltas over a base time for all iterations of the path) for the top ten paths are plotted. In the graph, the paths are ordered by path variation time, with the largest amount of variation time shown on the bottom. The y-axis measures percent of execution time relative to the total program execution time that is spent on variation over the path's base time. The percent execution time shown here represents the optimization opportunity and speedup potential that exists if optimization succeeded in making each invocation of the path execute in the shortest time that was observed during sampling (i.e., the base time). Consider the top path variation measured in the example "vortex" program. It consumes more than 30% of execution time. If we can optimize this path alone to remove even half the variation, we would achieve a 15% speedup in overall execution of the program. On average, the top ten path variations consume more than 43% of execution time and only the dominant path of variation (i.e., largest path variation measured for each program) consumes more than 17% of total execution time. This is encouraging for developers, since the majority of variation optimization potential can be exploited from a few of the top paths.

3.3 Path Variation Stability

The previous section showed the potential savings from the top ten path variations. If we apply an optimization to a highly varying path it may achieve significant speedup under conditions in which the path variations were collected. In addition, we want the optimization to be effective across inputs and system conditions. This entails measuring the stability of paths across the different conditions. In this section, we show experimentally that the top paths are stable across input and system load for the example benchmark suite.

3.3.1 System Load Stability

System load measures how strained the resources are during program execution. Heavy system load would mean CPU time is contended for and the strain on memory structures will cause more misses and stalls during execution. These misses may cause significant variations to appear that are non-existent under light system load. On the other hand, variations experienced with a light-system load may drown out from higher variations caused by heavy system load.

An experiment of the above described variational path profiling was conducted to find if measured path variations are stable across system load. The experiment computed path variations with a light system load and also with a heavy system load. For the light system load, no applications were executing during experimentation except for a few essential OS background services. For the heavy system load, we strained the system with a 3-D graphics game, called Unreal Tournament, during program path profiling. The game running during profiling caused the profiled program to execute between 2 and 5 times slower.

Figure 5:
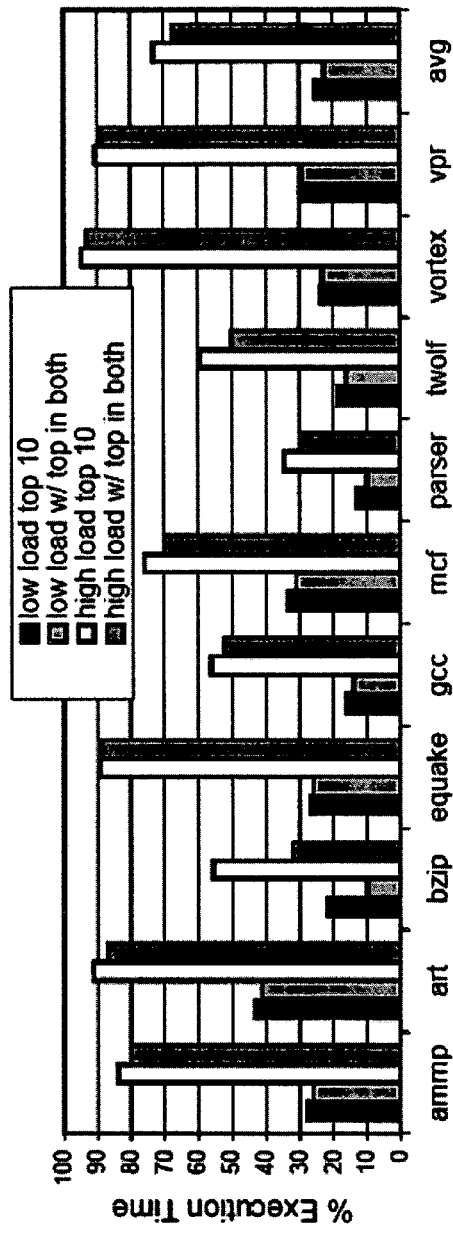
FIG. 5 is a bar chart illustrating stability of variational paths across different tool loads for the various example computer programs subjected to variational path profiling and analysis of the tool of FIG. 1.

FIG. 5 shows results of this experiment for the chosen 10 benchmark programs. The y-axis measures percent of execution time. The first and third bars show the aggregated path variations of the top ten paths under light and heavy system load, respectively. The second bar shows the aggregated path variations under light system load for the top ten variational paths found from profiles collected under heavy system load. This measures how stable the paths found under heavy system load are when the program is run under light system load. The fourth bar is like the second bar, but the top ten variational paths were chosen using the light load before aggregating variation. These results show that the majority of path variation experienced under light system load generally also will be observed under a heavy system load and vice versa. Another interesting observation is the significant difference in execution consumed by path variation. On average we see that the top ten path variations consume about 25% of execution under light system load, but over 70% under heavy system load. This observation is encouraging; since it implies that the top varying paths will vary more under strained conditions instead of a larger number of paths cause the higher variation.

3.3.2 Cross Input Stability

Just as system load can cause deviations in a program execution, different inputs can cause execution behavior to change dramatically. A heavily executed procedure under one input may become dormant with another input. Therefore, we further examine experimentally the stability of the top varying paths across inputs.

Figure 6:
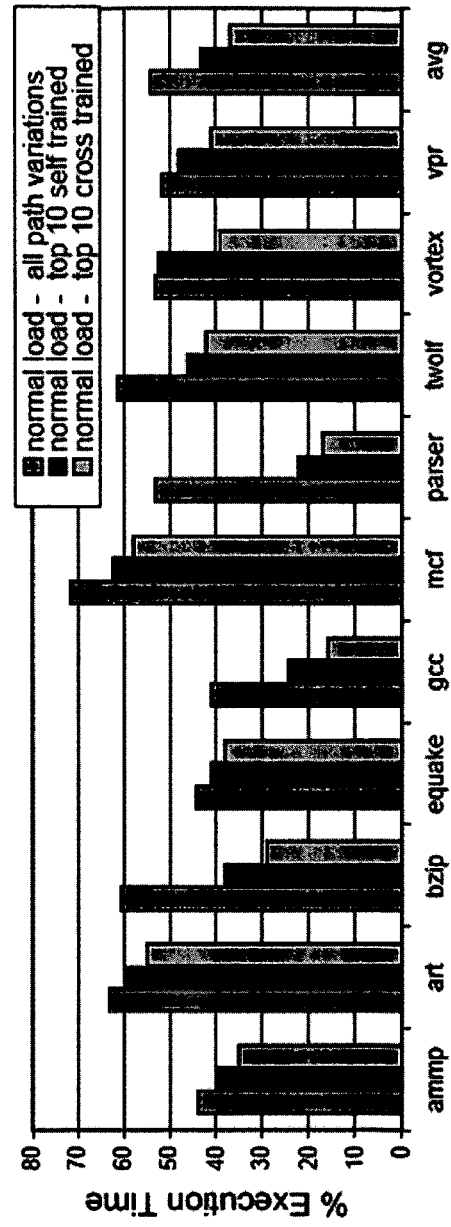
FIG. 6 is a bar chart illustrating stability of variational paths across inputs for the various example computer programs subjected to variational path profiling and analysis of the tool of FIG. 1.

To measure how stable the top paths are across inputs, we collected path variations for the benchmarks for two example sets of program inputs (the train and ref inputs in this example benchmark suite) under normal system load. Normal system load is similar to light system load, except that special care wasn't taken to minimize the system load and there may be lightweight applications are running in the background (e.g., text editor). In the experiment, we computed the aggregate variation for the top ten paths for the ref input, called self trained. Then, we computed the aggregate variation for the ref input using the top 10 paths found using the training input, called cross trained. These results are shown in FIG. 6. In this graph, three bars are plotted for each benchmark. The first bar shows the variational execution time for all paths in each program. The second bar shows the self-trained top ten path variations for the ref input. The third bar shows the cross-trained path variations for the ref input using the training input to pick the top 10 paths. The similar heights of the first bar in comparison to that of the second and third bars signifies that by using the top ten path variations we can account for the majority of all path variations. The high correlation between the aggregate variations seen between the second and third bars implies that the top varying paths are stable across the train and ref inputs. There are programs where the top ten paths don't capture the majority of all path variation. This is the case with bzip, gcc and parser. In those programs the top paths exhibit lower variation relative to other programs' top paths. One possible explanation for this is that these programs have a more balanced execution traversal through all the paths, and there isn't a small group of paths that dominate the execution.

3.4 Example of Variational Paths

We now examine the top paths that are found for the benchmarks examined and the performance speedup from applying very simple optimizations to those paths. We examine the top handful of paths in each program and found that they typically pointed to loops in which the only explanation for the variation was that there were memory stalls that were the main cause of this high path timing variation. For some of the iterations through the same exact path through the loop there would be no cache misses, whereas other iterations through the loop would have data operations miss in the cache.

Figure 7:
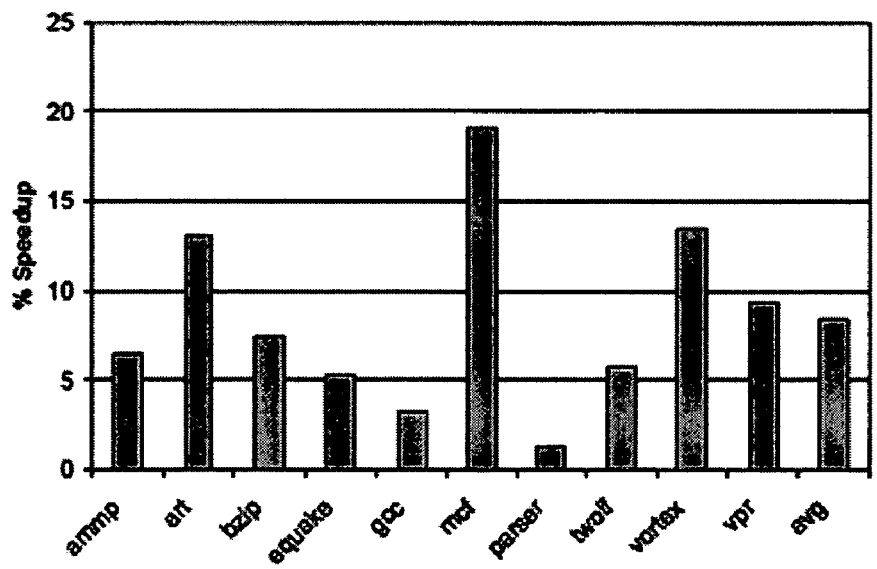
FIG. 7 is a bar chart of speed up results achieved from applying simple pre-fetching optimizations to paths identified as having high variation by the variational path profiling and analysis of the tool of FIG. 1.

After this analysis, we were able to optimize each of these paths in a matter of minutes applying very simple prefetching optimizations to achieve speedups ranging from 2% to 19%. The optimization we applied uses the Streaming SIMD Extension_mm_prefetch( ) to prefetch a data address to the L2 cache. FIG. 7 shows the percent savings in execution time achieved from these optimizations. This demonstrates the utility of knowing paths in which there are time variations to easily exploit, and the ease of using the variational path profiling and analysis described herein to find the top paths and optimize them to exploit these variations.

To better illustrate these results, FIGS. 8-10 show the optimizations applied on vpr, mcf and art benchmark programs for their top variational paths. FIG. 8 lists source code from the vpr benchmark that forms the path found to have the highest variation. This path variation was measured as responsible for almost 30% of execution time. The optimization code is marked with **. In this optimization example, we have a heap being traversed in geometric strides, in which an element is compared and pointer swapped with ones that have been visited in the previous iteration. A simple prefetching optimization has been inserted for this path, based on the assumption that some accesses to the heap miss and cause the variations in execution times. This optimization pre-fetches the heap element that will be accessed two iterations in the future. A condition is set for the pre-fetch to guarantee that we never attempt to access an element that is beyond the bound of the heap. This 2 line optimization is the only one we applied to vpr and it achieves nearly 10% in speedup on the ref input.

Another optimization example is shown for the benchmark "art" program in FIG. 9. In this example, a nested for-loop inside another for-loop accesses two elements, fl_layer[ti].P and bus[ti][tj], computes their product and stores the product in Y[tj].y. The main culprit of variation in this path is bus[ti][tj], because after the first iteration of the outer for-loop, all the elements accessed in fl_layer[ti].P will be warm in the cache. The optimization code inserted in this code segment is marked with **. This code bootstraps the outer for-loop to prefetch elements of bus[ti][tj] that will be accessed in the next iteration of the outer for-loop. The if-statement in line 4 is inserted to verify that we don't prefetch beyond the bounds determined by the outer for-loop. This condition will hold true for every iteration of the outer loop, except the last one. We don't achieve speedup for the first iteration, since prefetching is done for elements used in the second outer for loop iteration and up. Line 6 is the prefetching instruction and lines 5 and 7 do the original operation as seen in lines 9 and 10. Similar optimizations are applied to 3 other top paths in the art program. They result with 13% speedup of the program on the ref input.

Yet another optimization example is shown for the benchmark mcf program in FIG. 10. Here, we have a loop that traverses a linked list, and performs operations on the nodes depending on what conditions hold (e.g., line 10, 16, 17, and 22). A few data elements in this loop are being reused across the entire life of the loop, and the elements which cause variations are those dependent on the linked list nodes being traversed. The optimization strategy here is similar to the previous two, where optimization code is added to prefetch data at the start of the loop (lines 4-9) to be used in the next iteration. A condition is imposed on the prefetch operations to check if the next node exists. The data prefetched is used in the if-condition in line 10. A more implicit prefetch happens in line 4, where we check if the next node in the list exists. This access preempts the access that eventually happens in line 26. The potential advantage in doing this access earlier is that it can interleave a miss-penalty with other misspenalties that can occur during the main body of the loop. Including this optimization, we applied 2 more optimizations to the top 3 paths in mcf to achieve a speedup of 19%.

Simple prefetch optimization like the ones described have been applied to the top few paths in each of the programs. On average we achieve a speedup of 8.5%. This is encouraging since the analysis and optimization can be done on a program in a matter of minutes. For the programs that have high variation in the top 1-3 paths (art, mcf, vortex, vpr), we see a correspondence with higher speedup achieved (as shown in FIG. 7). For the programs that exhibit lower top path variation (e.g., gcc and parser), we find that less speedup is achieved relative to the other programs. This correlation reinforces our claim that the variational path profiling technique determines paths in the program that deserve optimization, as well as potential speedup gains that bound the optimizations.

4. Computing Environment

The above described exemplary tool 100 (FIG. 1) that implements variational path profiling, analysis and optimization (referred to herein generally as variational path profiling techniques) can be implemented on any of a variety of computing devices and environments, including computers of various form factors (personal, workstation, server, handheld, laptop, tablet, or other mobile), distributed computing networks, and Web services, as a few general examples. The variational path profiling techniques can be implemented in hardware circuitry, as well as in software 1580 executing within a computer or other computing environment, such as shown in FIG. 11.

Figure 11:
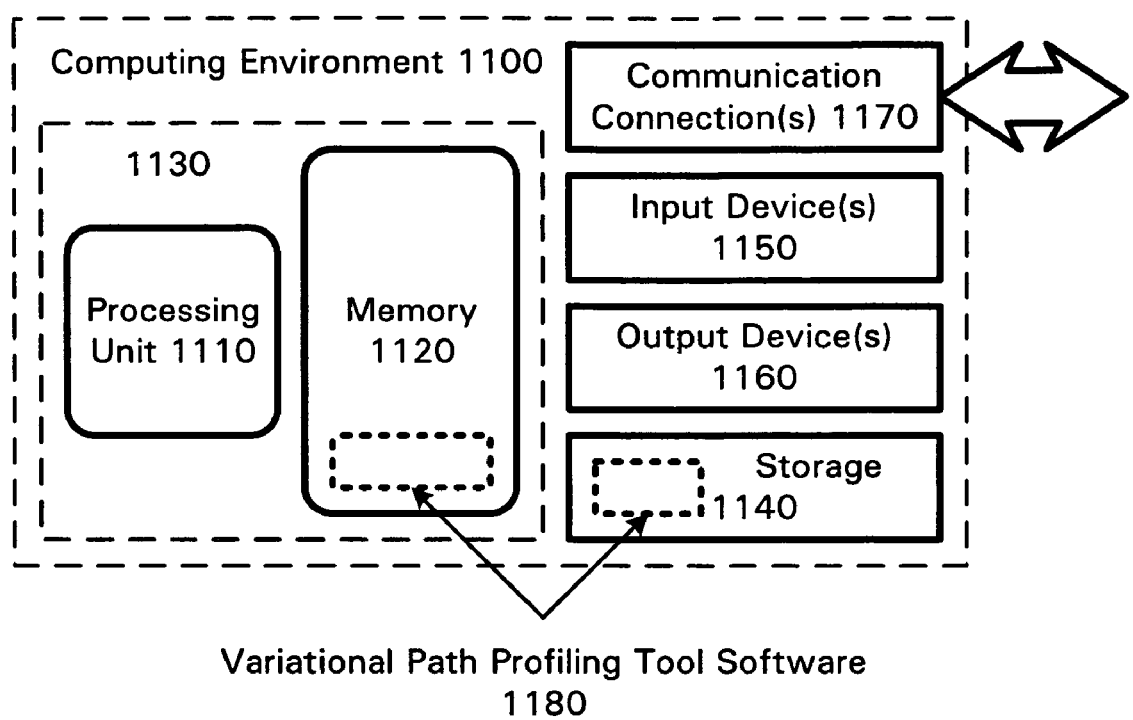
FIG. 11 is a block diagram of a suitable computing environment for implementing the bi-scale radiance transfer image rendering of FIG. 1.

FIG. 11 illustrates a generalized example of a suitable computing environment 1500 in which the described techniques can be implemented. The computing environment 1500 is not intended to suggest any limitation as to scope of use or functionality of the invention, as the present invention may be implemented in diverse general-purpose or special-purpose computing environments.

With reference to FIG. 11, the computing environment 1500 includes at least one processing unit 1510 and memory 1520. In FIG. 11, this most basic configuration 1530 is included within a dashed line. The processing unit 1510 executes computer-executable instructions and may be a real or a virtual processor. In a multi-processing system, multiple processing units execute computer-executable instructions to increase processing power. The memory 1520 may be volatile memory (e.g., registers, cache, RAM), non-volatile memory (e.g., ROM, EEPROM, flash memory, etc.), or some combination of the two. The memory 1520 stores software 1580 implementing the tool 100 with variational path profiling.

A computing environment may have additional features. For example, the computing environment 1500 includes storage 1540, one or more input devices 1550, one or more output devices 1560, and one or more communication connections 1570. An interconnection mechanism (not shown) such as a bus, controller, or network interconnects the components of the computing environment 1500. Typically, operating system software (not shown) provides an operating environment for other software executing in the computing environment 1500, and coordinates activities of the components of the computing environment 1500.

The storage 1540 may be removable or non-removable, and includes magnetic disks, magnetic tapes or cassettes, CD-ROMs, CD-RWs, DVDs, or any other medium which can be used to store information and which can be accessed within the computing environment 1500. The storage 1540 stores instructions for the software 1580 of the exemplary tool implementing the variational path profiling techniques.

The input device(s) 1550 (e.g., for devices operating as a control point in the device connectivity architecture 100) may be a touch input device such as a keyboard, mouse, pen, or trackball, a voice input device, a scanning device, or another device that provides input to the computing environment 1500. For audio, the input device(s) 1550 may be a sound card or similar device that accepts audio input in analog or digital form, or a CD-ROM reader that provides audio samples to the computing environment. The output device(s) 1560 may be a display, printer, speaker, CD-writer, or another device that provides output from the computing environment 1500.

The communication connection(s) 1570 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The variational path profiling techniques herein can be described in the general context of computer-readable media. Computer-readable media are any available media that can be accessed within a computing environment. By way of example, and not limitation, with the computing environment 1500, computer-readable media include memory 1520, storage 1540, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of software program execution profiling, comprising:
    measuring variation in execution time between iterations of paths through the software program, the variation in execution time measured for multiple iterations of each path over base times for the paths; and
    identifying paths having higher execution time variation;
    wherein said measuring comprises:
    inserting instrumentation code into the software program;
    causing the software program to execute under a usage scenario;
    recording profiling data by the instrumentation code during said execution of the software program, the profiling data including at least execution times for at least some iterations of at least some paths of the software program; and
    performing a path variation analysis determining which of the paths have higher execution time variation; and
    wherein said performing path variation analysis comprises:
    determining base times of execution of the paths;
    determining variation times for multiple iterations of each of the paths as a difference of the execution times of the multiple iterations of each of the paths from the base times; and
    determining path variation times for the paths as a sum of the variation times of the multiple iterations of the respective paths.

2. The method of claim 1 wherein said recording profiling data comprises:
    periodically sampling traces of the software program execution for low overhead profiling of path execution time variation.

3. The method of claim 2 wherein said recording profiling data comprises:
    structuring the instrumentation code according to a bursty tracing framework that transitions between execution of a very lightly instrumented software program version a majority of the time, and occasional execution of a fully instrumented software program version during which path execution time profiling data is recorded.

4. The method of claim 2 wherein said recording current time in the profiling data comprises recording a hardware cycle counter.

5. The method of claim 2 wherein said recording the path signature in the profiling data comprises recording a value indicative of a starting location of the respective path.

6. The method of claim 1 wherein said recording profiling data comprises:
   recording at least a path signature and current time at a starting point of a path; and recording at least a path signature and current time at an end point of a path.

7. The method of claim 6 wherein said recording the path signature in the profiling data comprises recording data indicative of a branch history of the path.

8. The method of claim 1 wherein said performing path variation analysis further comprises:
   ranking the paths according to their determined path variation times; and
   identifying the paths having the highest determined path variation times as those having higher execution time variation.

9. A variational path profiling tool comprising:
   a computer processor configured to perform the actions of:
   an execution profiler operative to measure and collect execution timings for a plurality of paths taken during execution of a software program under a usage scenario; and
   a path variation time analyzer operative to identify paths having high execution time variation over base times for the paths based on the collected execution timings, the path variation time analyzer comprising:
      means to calculate a base time of execution of each of the paths, the base time representing a minimum observed time out of multiple observed times from multiple iterations of the paths;
      means to calculate a variation time in excess of the base time for each of multiple iterations of the paths; and
      means to calculate a cumulative total variation time of all of the multiple iterations for the respective paths.

10. The variational path profiling tool of claim 9 wherein the execution profiler further comprises:
   an instrumenting means for embedding instrumentation code into the software program, the instrumentation code operating upon execution of the software program to record profiling data for the paths, the profiling data including a path identification and execution timing for iterations of the paths.

11. The variational path profiling tool of claim 10 wherein the instrumentation code is structured to profile path execution timings in periodic bursty tracing samples of the software program execution for reduced performance overhead during profiling.

12. The variational path profiling tool of claim 9 wherein the path variation time analyzer further comprises means to rank the paths in order of their total variation times.

13. A method of optimizing a software program, comprising:
   profiling execution of the software program using a bursty tracing framework, the profiling measuring execution timings for multiple iterations of a plurality of paths taken during the execution of the software program;
   determining base times of execution of the paths, each base time for a path representing a minimum observed time out of multiple observed times from multiple iterations of the paths;
   analyzing the variability in execution time of each of the paths in the profiled execution of the software program based in part on the sum of execution time differences of multiple iterations of each path from base times determined for the paths;
   identifying a number of top variable paths having the highest variability in execution time over the base times; and
   modifying the software program to apply optimizations to avoid stalls from data access at one or more levels of a computer memory hierarchy in the identified top variable paths.

14. The method of claim 13 wherein said applying optimizations comprises inserting one or more operations in a path to effect prefetching for a data access.

* * * * *

UNITED STATES PATENT AND TRADEMARK OFFICE
CERTIFICATE OF CORRECTION

PATENT NO.       : 7,607,119 B2
APPLICATION NO.  : 11/115924
DATED            : October 20, 2009
INVENTOR(S)      : Chilimbi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1058 days.

Signed and Sealed this

Twelfth Day of October, 2010

David J. Kappos
*Director of the United States Patent and Trademark Office*